United States Patent [19]

Kawamata

[11] Patent Number: 4,872,649
[45] Date of Patent: Oct. 10, 1989

[54] LIQUID TYPE MASS DAMPER WITH ELONGATED DISCHARGE TUBE

[75] Inventor: Shigeya Kawamata, Shihei, Japan

[73] Assignee: Mitsubishi Jukogyo Kabushiki Kaisha, Tokyo, Japan

[21] Appl. No.: 159,062

[22] Filed: Feb. 23, 1988

[30] Foreign Application Priority Data

Feb. 25, 1987 [JP] Japan .................. 62-041793

[51] Int. Cl.$^4$ .............. F16F 9/04; F16F 7/10; F16M 13/00; E02D 27/34
[52] U.S. Cl. .................. 267/136; 52/167 R; 188/298; 188/379; 248/559; 248/636
[58] Field of Search ............ 188/378, 379, 380, 298; 52/167; 267/34, 113, 121, 217, 140.1, 140.4, 221, 256, 64.27, 286, 136, 64.19, 64.21, 64.23, 64.24, 64.28, 122, 124; 248/562, 559, 636, 638; 180/300

[56] References Cited

U.S. PATENT DOCUMENTS

| 989,958 | 4/1911 | Framm | 188/380 |
|---|---|---|---|
| 2,974,755 | 3/1961 | Stokes | 188/298 |
| 3,752,270 | 8/1973 | Valdespino | 188/298 X |
| 4,581,199 | 4/1986 | Bioret et al. | 52/167 X |
| 4,735,296 | 4/1988 | Pinson | 188/379 |

FOREIGN PATENT DOCUMENTS

| 0250956 | 1/1988 | European Pat. Off. | 267/140.1 |
|---|---|---|---|
| 642711 | 9/1928 | France | 188/298 |
| 0047077 | 4/1975 | Japan . | |
| 0049667 | 12/1977 | Japan . | |
| 0002487 | 1/1978 | Japan . | |
| 0023151 | 7/1978 | Japan . | |
| 0146421 | 11/1981 | Japan | 188/300 |
| 129943 | 8/1982 | Japan | 188/380 |
| 0215823 | 9/1986 | Japan | 267/136 |
| 649364 | 5/1985 | Switzerland | 52/167 |
| 791342 | 2/1958 | United Kingdom | 188/379 |

*Primary Examiner*—Robert J. Oberleitner
*Attorney, Agent, or Firm*—McGlew & Tuttle

[57] ABSTRACT

A new mass damper that avoids the formation of a higher-order resonance by utilizing the inertial resistance of a flowing liquid is disclosed. This damper solves the problem of an additional new degree of freedom due to the additional mass system associated with the conventional mass damper and makes it possible to control random vibration with a broad spectrum such as earthquakes. Also, several examples in which this damper is used for multilevel structures are disclosed.

2 Claims, 9 Drawing Sheets

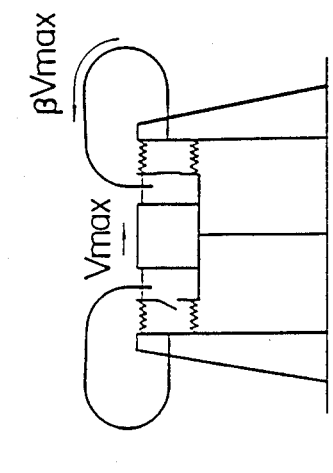
FIG. 2(a)  FIG. 2(b)  FIG. 2(c)
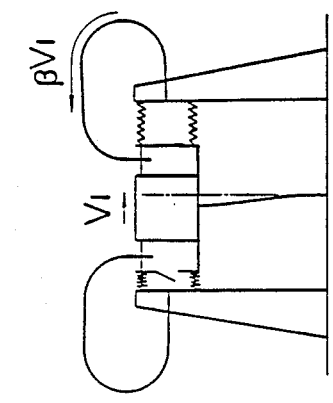
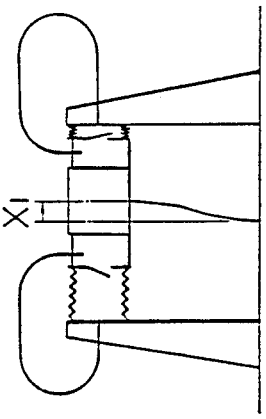
FIG. 2(d)
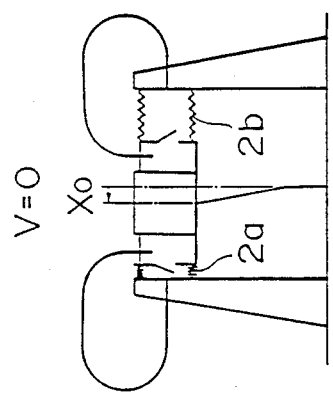
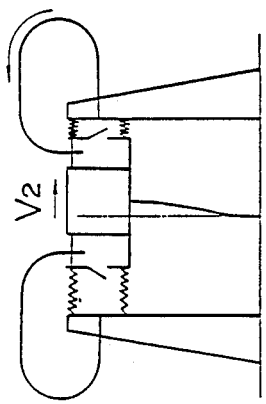
FIG. 2(e)

LIQUID TYPE MASS DAMPER WITH ELONGATED DISCHARGE TUBE

FIELD OF THE INVENTION AND RELATED ART STATEMENT

The present invention relates to a damper for controlling vibration of architectural structures, supporting structures of machines, automobile structures and the like.

Previously, the type of dampers that utilize the viscous resistance of a flowing liquid, such as oil dampers, have been known for reducing the vibration of various structures caused by external disturbances. In addition, mass dampers that utilize the inertial resistance of a mass attached to a structure, such as dynamic absorbers, pendulum type vibration reduction mechanisms, (Japanese Patent Publication No. 49667/19877, ibid. No. 2 487/1978, ibid. 23151/1977), a vibration controlling mechanism of the mass pump type (Japanese Provisional Patent Publication No. 47077/1975), have also been known.

In a mass damper, an additional mass is connected to a main structure by a spring and forms a new vibrational system. By directing vibrational energy of the main structure to the attached new system near the original resonance frequency of the main structure, the vibration of the main structure can be controlled.

However, in the conventional mass damper a new degree of freedom due to the attached new mass system introduces a higher-order resonance with a frequency higher than the natural frequency of the main structure. Therefore, while the conventional mass damper is effective against external vibration forces with known frequency spectra such as mechanical vibration, it poses the problem of a higher-order resonance against random vibration with a broad spectrum such as earthquakes making it inadequate as a vibration sampler in such a case.

OBJECT AND SUMMARY OF THE INVENTION

In view of the above problem the present invention provides new types of mass dampers that do not form a higher-order resonance, and it is an object of the present invention to obtain a mass damper that is effective against random external vibration such as earthquakes.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

The attached figures show preferred embodiments of the present invention:

FIGS. 2a-2e are schematic views progressively describing the action of the damper of the present invention;

DETAILED DESCRIPTION OF THE PREFERRED EMBODIMENTS

Figure 1:
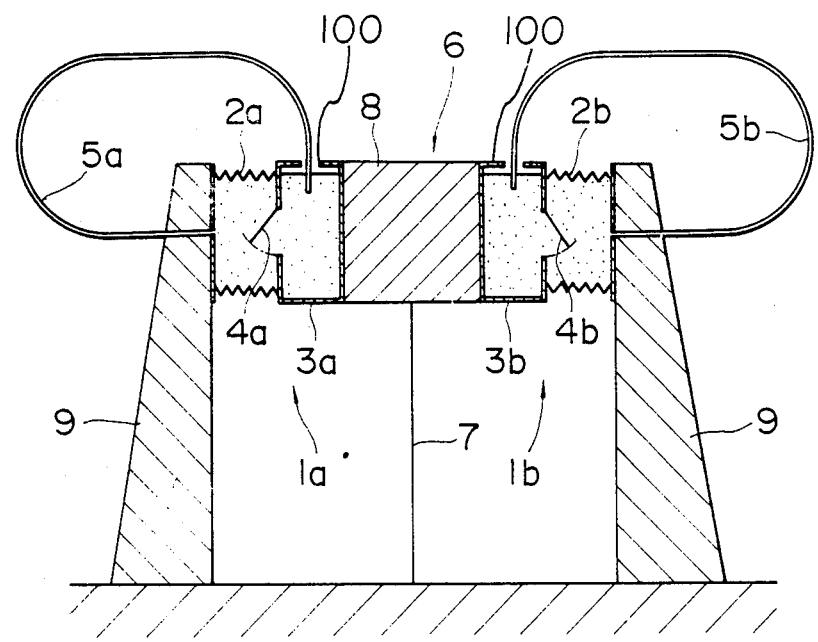
FIG. 1 is a schematic view of the damper of the present invention.

With reference to FIG. 1 (a schematic view) the construction of the present invention is explained. A liquid damper (1a, 1b) of the present invention comprises sealed and cylindrical liquid containers 2a, 2b that are expandable in an axial direction (i.e. in a direction along a central axis of the cylindrical liquid containers) with minimum changes in its sectional area for different internal pressures. Liquid reservoirs 3a, 3b are provided to supply a liquid to the container. The liquid reservoirs 3a and 3b each have an opening 100 to atmosphere. Check valves 4a, 4b are associated with each liquid container to prevent the liquid from flowing from the respective containers to the corresponding reservoirs 3a, 3b. Narrow and long liquid discharge tubes 5a, 5b extend out of the respective containers 2a 2b. The liquid 2 containers 2a and 2b are disposed in a structure 6 in such a way that each container extends and contracts according to the vibration of said structure 6. In FIG. 1, the structure 6 is shown as a solid mass 8 supported by a spring 7. Reference numeral 9 represents a rigid body bracket.

FIG. 2(a) shows the vibrational systems of FIG. 1 when the mass 8 is spaced by $X_o$ to the right and held there. As it is released from this position the mass 8 starts moving toward the right and picks up speed because of the restoring force of the spring 7. Now a free oscillation begins.

FIG. 2(b) shows the system in the process of acceleration. During this process, since the container on the left-hand side 2a is pulled and its internal pressure becomes negative opening up the check valve 4a, the liquid flows from the reservoir 3a to the container 2a without resistance. At the same time, the other container on the right-hand side 2b is compressed and a positive internal pressure closes the check valve 4a. Thus, a liquid flows out through the narrow discharge tube 5a. If the velocity of the mass 8 is $V_\beta$, the velocity of the liquid in the discharge tube has to be $\beta V_1$, where $\beta$ is the ratio between the sectional area A of the container 2 and the sectional area a of the discharge tube 8 ($\beta = A/a$). By the same token, when the acceleration of the mass 8 is $\dot{V}_1$ the acceleration of the liquid in the tube is $\beta \dot{V}_1$, and the pressure at the entrance point of the tube, accelerating the liquid in the tube, is conducted into the container with no change in its intensity. Now, with the same principle as hydraulic jacks, the inertial resistance of the liquid is multiplied $\beta$ times and transmitted to the liquid reservoir and further to the mass 8 to act as as resistance against the acceleration of the mass 8.

Here, the inertial resistance of the discharging liquid acting on the mass 8 can be expressed as an effective mass $M_{ef}$ added to the original mass:

$$M_{ef} = \beta^2 m,$$

where M is the mass of the liquid in the discharge tube. Therefore, the natural period of the entire vibrational system increases from the natural period for the system without the mass damper $T_o$, $$T_o = (\tfrac{1}{2}\pi)\sqrt{k/M},$$

to $T_1$ with the damper, $$T_1 = (\tfrac{1}{2}\pi)\sqrt{k/(M+M_{ef})}$$

$$T_1 = (\tfrac{1}{2}\pi)\sqrt{k/(M+\beta^2 m)},$$

where M is the solid mass of the structure 6, and k is the spring constant.

FIG. 2(c) shows the system when the spring 7 is in its neutral position as the mass 8 moves further. Here, the mass has the maximum velocity $V_{max}$ and the velocity of the discharging liquid is $\beta V_{max}$.

FIG. 2(d) shows the system when the mass 8 has moved beyond the neutral position of the spring toward the right. At this point the spring acts as a brake to the mass with a force in the opposite direction of motion of the mass, and the mass slows down. At the same time, the liquid in the discharge tube 5b tries to keep the same speed for the mass because of its own inertia. A resulting negative pressure opens up the check valve, and the liquid, now free from the restoring force of the spring, flows freely. Also, since the liquid reservoir 3b is open to the atmosphere, no negative internal pressure is induced, and the liquid, flowing freely, does not exert any force on the mass 8.

Furthermore, since the container 2a is pulled from its neutral shape, its internal pressure is kept negative and the check valve is left open to let the liquid flow freely from the reservoir to the container.

Thus, during the process of deceleration, since the liquid does not exert any inertial forces onto the mass and generates no additional masses in effect, the system moves with its original natural period $T_o$. Also, the liquid in the discharge tube 5b releases the energy acquired during the acceleration process out of the vibrational system in the form of free flow.

FIG. 2(e) shows the system when the displacement of the solid mass is maximum to the right and its motion has stopped. As a result of the release of kinetic energy of the liquid from the system during the deceleration process, the vibration is damped and the amplitude $X_1$ becomes less than the above initial displacement $X_o$.

Now the system starts moving toward the left. During this process the liquid in the container on the left is discharged. By repeating this kind of pumping action of the liquid in the right and left discharge tubes alternatively, the vibrational energy of the system is released intermittently.

Figure 3:
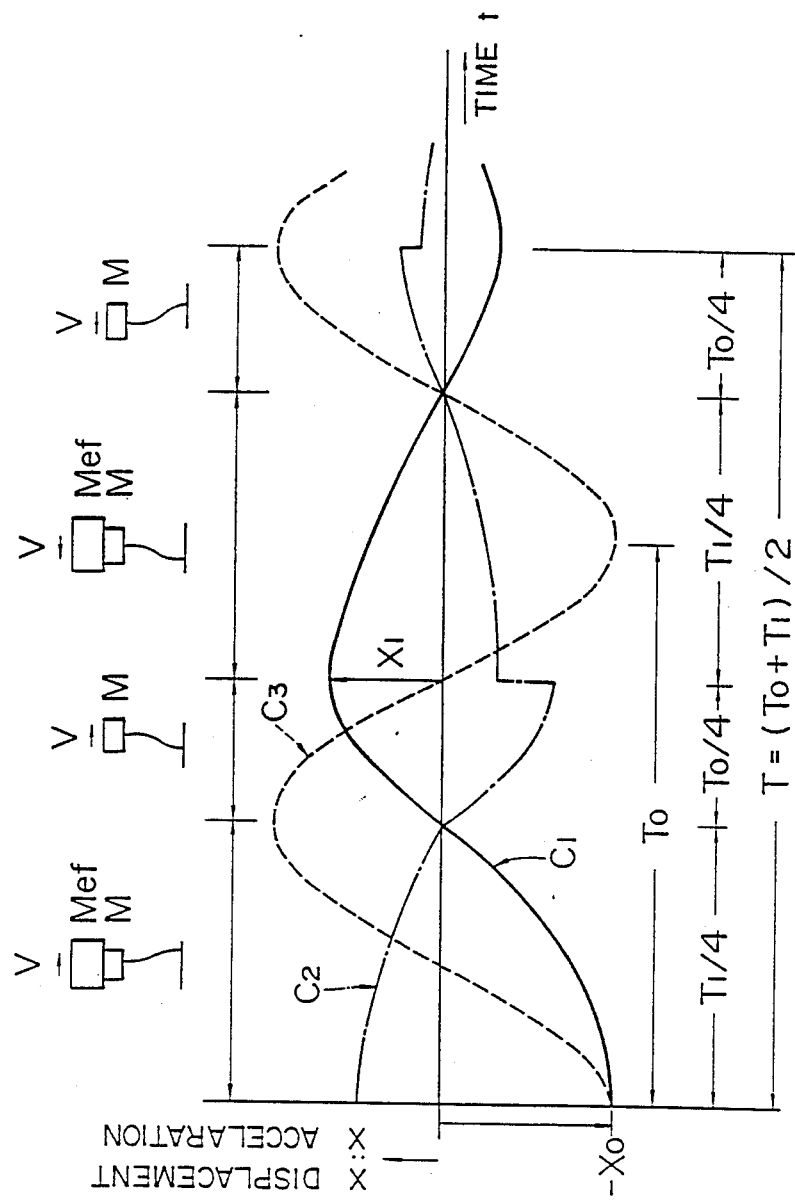
FIG. 3 is a graph depicting a wave form of free vibration of a structure with the present damper.

FIG. 3 shows a vibrational wave form of free vibration of the system undergoing the above processes as a function of time. The horizontal axis is time t, and the vertical axis shows the displacement X and the acceleration $\ddot{X}$.

The curve $C_1$ shows the displacement of the spring-mass system with the device of the present invention and the curve $C_2$ its acceleration. Also, the curve $C_3$ shows the displacement of the spring-mass system without the device of the present invention. Here, the spring-mass system itself is assumed to be undamped, and the viscosity of the damper liquid is ignored. The small drawings in the upper portion of the figure shows the deformation of the spring and the existence (or non-existence) of the additional effective mass due to the inertial resistance of a liquid at each phase of vibration.

As seen in FIG. 3, when the mass damper is used, the overall characteristic period increases due to the internal resistance of the liquid. Furthermore, the release of kinetic energy of the liquid out of the system results in damping effects even if the viscosity of the liquid is ignored.

Figure 4:
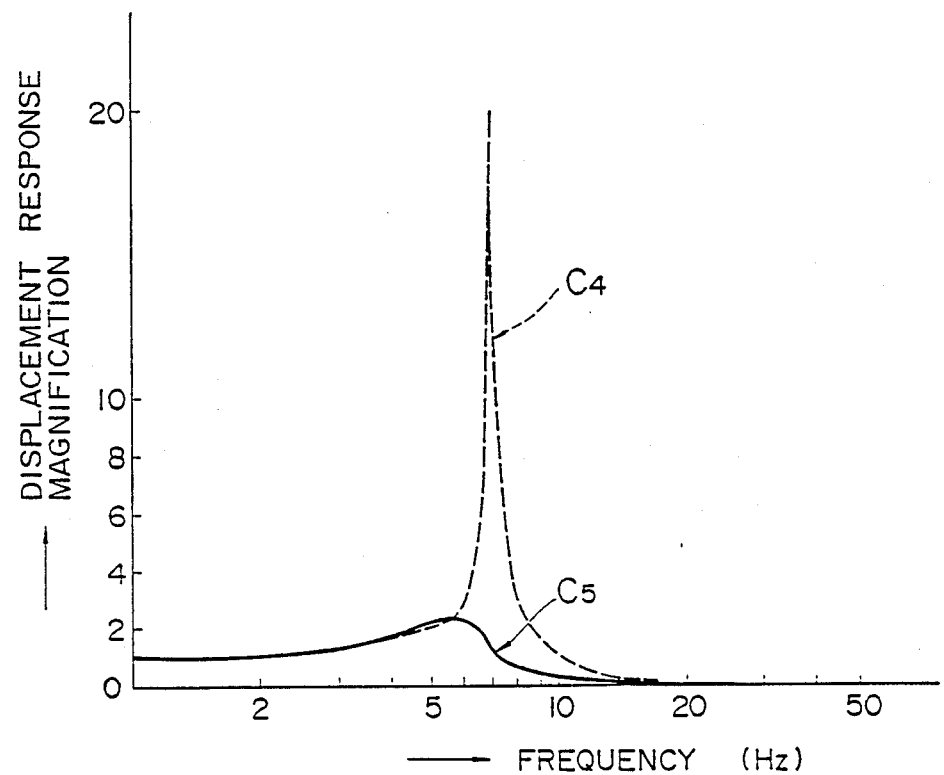
FIG. 4 is a graph depicting a resonance curve of free vibration of a structure with the damper of the present invention.

FIG. 4 shows experimental results obtained by adding a horizontal sinusoidal oscillation to a portal frame using a vibration table. The horizontal axis is the frequency of the added oscillation, and the vertical axis the stationary displacement magnification (i.e., the displacement amplitude of the upper end of the frame divided by the displacement when the added vibrational force is applied in a stationary manner). In this figure, the curve $C_4$ is a resonance curve when the vibration is applied to the frame alone, and the curve $C_5$ is a resonance curve when the damper of the present invention is attached to the same frame.

For the experiment of FIG. 4, a frame and a damper with the following specifics were used.

Frame mass: M = 72 kg
Sectional area of the liquid container: A = 69.4 cm
Sectional area of the discharge tube: a = 1.13 cm
Ratio of the sectional areas: $\beta = A/a - 61.4$
Length of the discharge tube: $\beta = 250$ cm
Liquid used: Water
Mass of the liquid in the discharge tube: m = $\rho$al = 0.283 kg
Effective mass of the liquid: $M_{ef} = \beta^2 m = 1067$ kg It is seen in this figure that this damper reduces the amplitude of the resonance point significantly and that no higher-order resonances are introduced.

As described above the mass damper of the present invention has the following effects on the vibrational characteristics of a structure.

(i) Lengthening of the characteristic period.
(ii) Increasing damping.
(iii) Nonlinearity due the alternation of phases with two different natural periods.

When a sinusoidal external force is applied to a vibrational system whith this damper, a resonance occurs at a frequency lower than the original natural frequency of the structure and the amplitude of this resonance point is extremely small compared to the system without this damper because of the combined effect of the increased damping (ii) and the nonlinearity of (iii) above.

Furthermore, the additional effective mass due to the inertial resistance of the liquid is released out of the vibrational system when the system goes into the deceleration process and does not act in the direction of the deflection spring. Therefore, the additional mass does not add a new degree of freedom of vibration to the original system and does not create a higher-order resonance.

When the damper of the present invention is used for a structure which is subjected to a random vibration such as earthquakes, the overall vibrational response is significantly reduced because the resonant response is suppressed by high damping. Also, as no higher-order resonance is introduced, the ability of the structure to filter the high frequency components of the ground is maintained. It is in this point that the present invention completely differs from the conventional mass damper.

In the following the novel damper of the present invention is further explained with several embodiments for multi-storied buildings.

Figure 5:
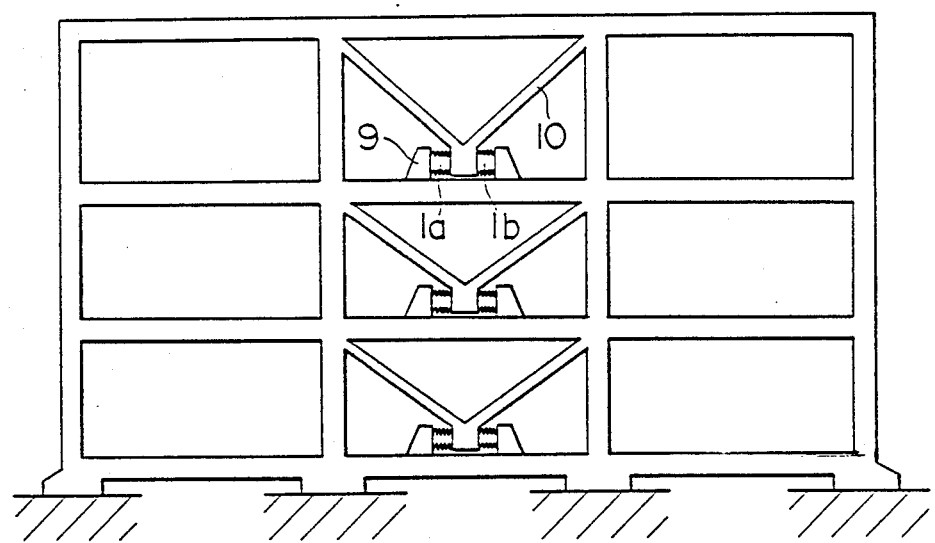
FIGS. 5 to 7 are arrangement diagrams showing positions of the dampers in relation to a structural framework.

FIG. 5 is an embodiment showing the dampers and a frame (structure) in relation to each other. A pair of dampers 1a', 1b' are attached onto each floor through brackets 9. The other end of each damper is connected fixedly to the beam of the floor immediately above the one on which the damper is placed through a diagonal member 10.

In this arrangement, the dampers operate by relative displacement of the floors and reduce the vibration of the frame.

Figure 6:
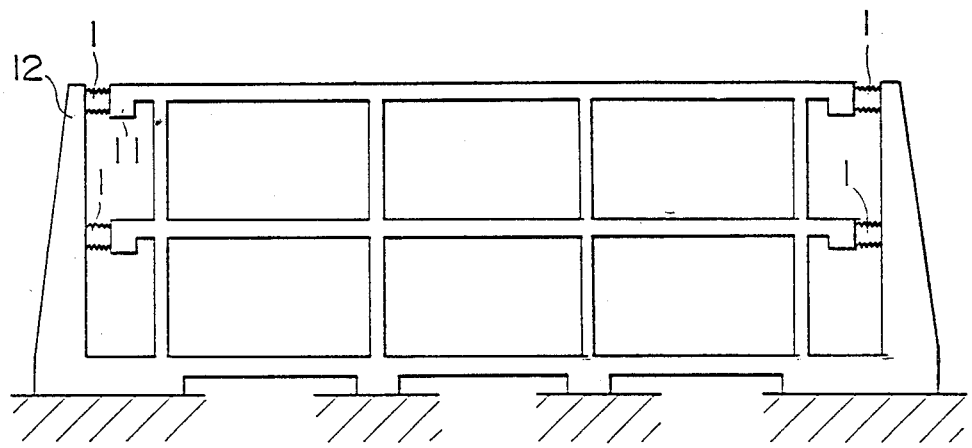

FIG. 6 is another embodiment showing the dampers and a frame in relation to each other. A damper 1c is placed between the outer ends 11 of an internal frame and an outer supporting structure 12 that stands independently of the internal frame at the periphery of a building. In this arrangement the dampers operate when there exists a relative displacement between the internal frame and the outer supporting structure and reduce the vibration of the internal frame.

Figure 7:
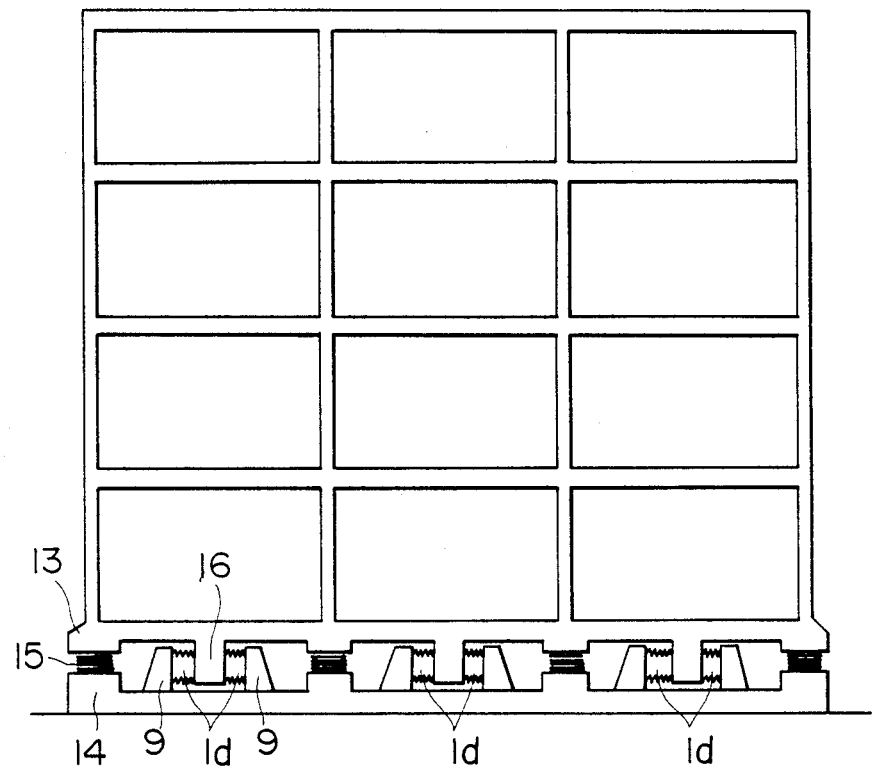

FIG. 7 shows an arrangement of the dampers in a base isolated building. The main frame is supported by laminated rubber bearings 15 disposed between bases 13 and 14. A damper 1d is connected to the lower base through a base bracket 9 and to the upper main frame through an upper bracket 16.

In this arrangement, the dampers operate by a relative displacement between the upper and lower bases. They thus reduce the vibration of the upper structure and keep the deformation of the multilayer rubber bearings to a minimum.

Figure 8:
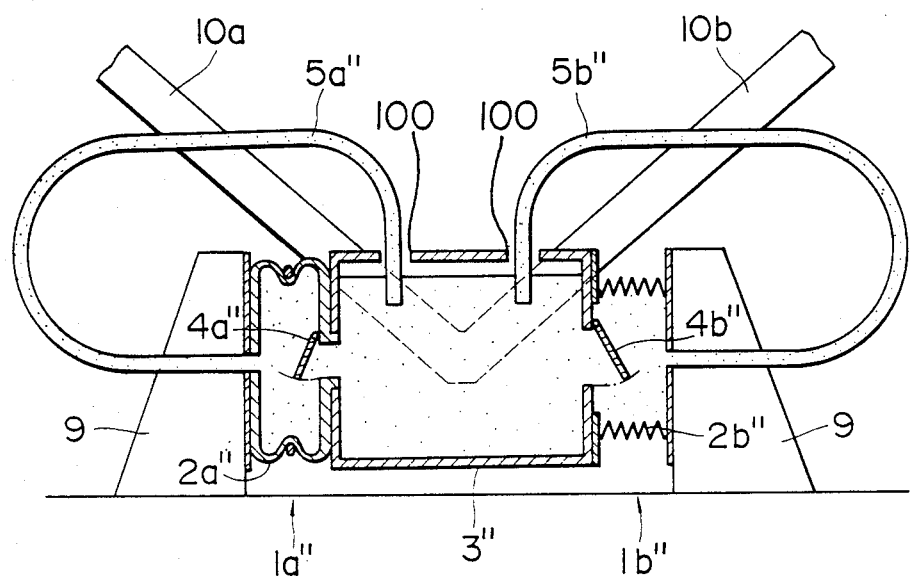
FIGS. 8 to 12 are sectional views of embodiments of the damper of the present invention.

FIG. 8 shows a damper arrangement when dampers 1a", 1b" are used in pairs as shown in FIG. 5. A center liquid reservoir 3" with an opening to atmosphere 100, is connected fixedly to diagonal members 10a, 10b which transmit vibration of the upper floor to cylindrical liquid containers 2a", 2b". The liquid reservoir 3" and the containers are connected through check valves 4b" and discharge tubes 5a" and 5b", and the liquid container is fixed to a floor by a bracket 9.

In this figure, the cylindrical liquid container 2b" on the right comprises a bellows, and the cylindrical liquid container 2a" on the left comprises a bellows type air spring rubber container to show two examples.

Figure 9:
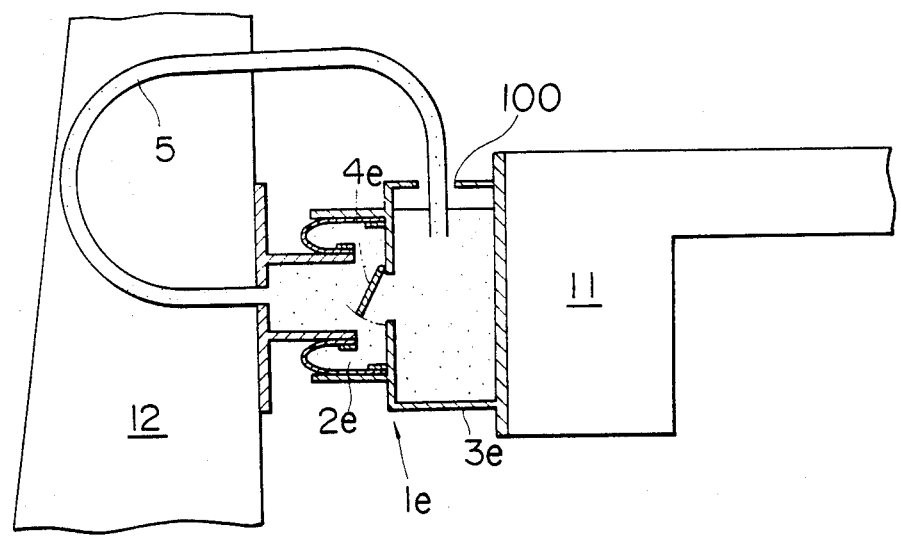
Figure 10:
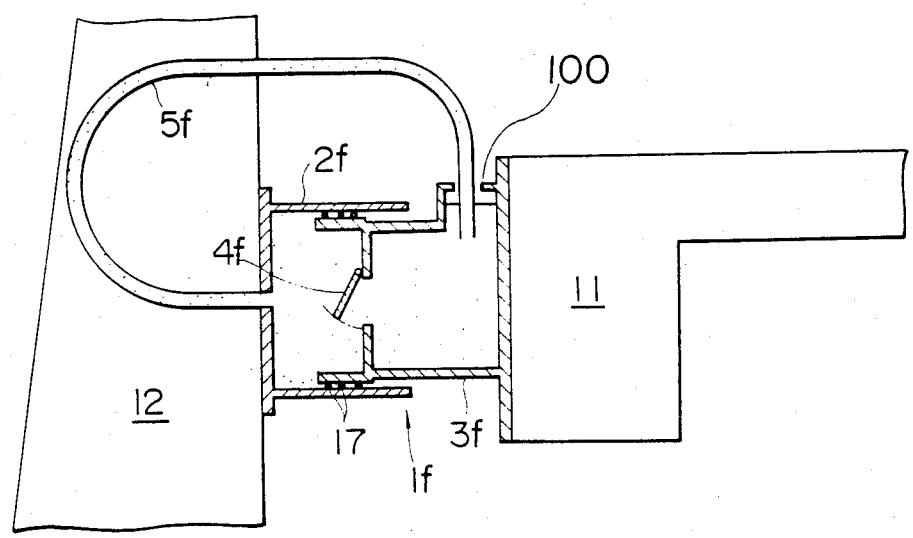

FIG. 9 is an embodiment using dampers separately as shown in FIG. 6. The dampers 1e are disposed between the outer end 11 of an internal frame and the neighboring wall 12. A liquid reservoir 3e, with an opening 100 connected to atmosphere, is connected to a cylindrical liquid container 23e by a check valve 4e and discharge tube 5e. Here, the liquid container 2 is shown for the case in which a diaphragm type air spring rubber container is used. FIG. 10 is also an embodiment using dampers separately as in FIG. 6. The damper shown is a piston type, and the inner cylinder of the piston also acts as a liquid reservoir 3f, with opening to atmosphere 100, connected to cylindrical liquid container 2f by valve 4f and discharge tube 5f. 17 denotes a packing material.

Figure 11:
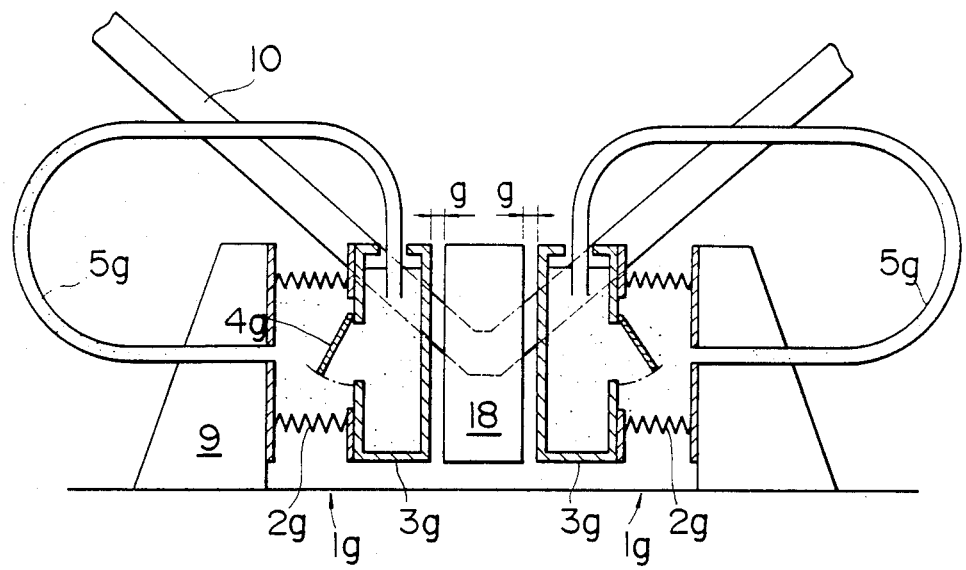

FIG. 11 shows an embodiment in which two dampers are placed with certain gaps between the dampers and the structure. Between a center metal piece 18 fixed to a slanting member 10 and liquid reservoirs 3g of two dampers, gaps g are formed. Each reservoir 3g is connected to a cylindrical liquid container 2g by a valve 4g and a discharge tube 5g.

When the vibrational amplitude of the upper structure becomes greater than the gap g the dampers start operating. As the amplitude increases the length of phase in which the dampers are in operation also increases, giving the vibrational system additional nonlinearity which depends on vibrational amplitude.

Figure 12:
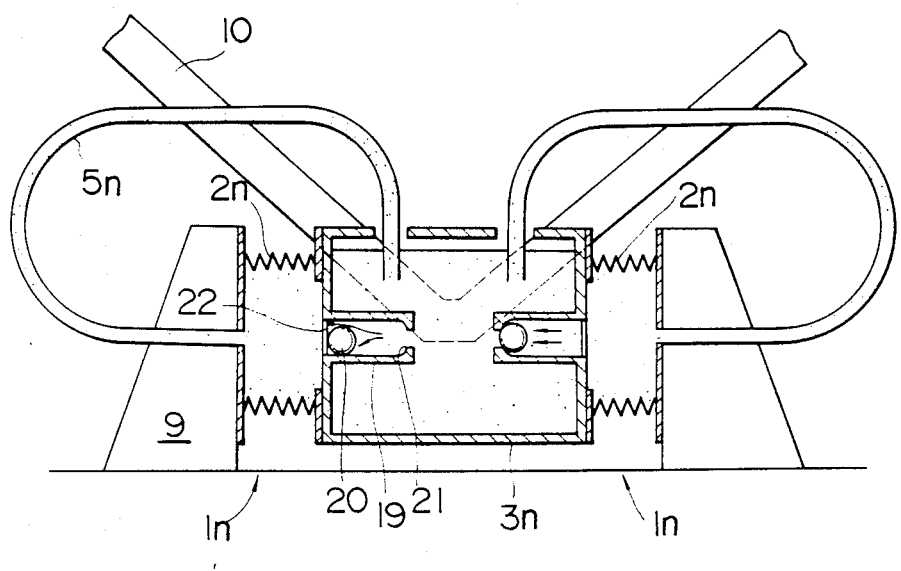

FIG. 12 shows an embodiment in which the gap effect of FIG. 11 is realized by using all ball valves. A liquid reservoir 3h is connected to two cylindrical liquid containers 2h on the left and right through valve tubes 19. Discharge tubes 5h are provided in a manner similar to the other embodiments. Inside the valve tubes a valve ball made of rubber is contained, and a valve seat 21 in the inner end of the valve tube with a ball 20 and a rod shaped stopper 22 at the outer end are disposed.

When the inner pressure of the container is negative the liquid flows into the container around the periphery of the valve ball which is held at the stopper. On the other hand, when the pressure of the container becomes positive the ball in the valve moves from the stopper to the inside reaching the valve seat. At this point the flow of the liquid is stopped and the liquid begins to flow out of the container. Therefore, during the phase in which the ball moves from the stopper to the valve seat the dampers do not operate producing the same effects as the gaps in FIG. 11.

While specific embodiments of the invention have been shown and described in detail to illustrate the application of the principles of the invention, it will be understood that the invention may be embodied otherwise without departing from such principles.

What is claimed is:

1. A liquid type mass damper comprising:
   a sealed cylindrical liquid container having an axial dimension and a radial dimension, said liquid container being expandable in an axial direction with minimum changes in its sectional area for different internal pressures;
   a liquid reservoir positioned adjacent said cylindrical liquid container, said liquid reservoir and said cylindrical liquid container defining an opening providing communication between said cylindrical liquid container and said liquid reservoir; a liquid disposed in said liquid container and said liquid reservoir; check valve means positioned within said opening for preventing said liquid from flowing from said cylindrical liquid container to said liquid reservoir and allowing liquid to flow substantially unrestricted from said reservoir to said container;
   a long and narrow liquid discharge tube having a length which is significantly longer than the axial dimension of said cylindrical liquid container and having a tube cross section which is significantly smaller than said opening, said liquid discharge tube extending out of said container and into said reservoir, said liquid reservoir having an opening to atmosphere, said cylindrical liquid container and said adjacent liquid reservoir being disposed between structural elements such that said liquid container expands and contracts in an axial direction of said cylindrical liquid container according to the vibrations of said structural elements.

2. A liquid type mass damper according to claim 1, wherein: said cylindrical liquid container and said liquid reservoir adjacent said cylindrical liquid container are positioned between said structural elements such that a gap is formed between one of said cylindrical liquid container and said liquid reservoir and an adjacent one of said structural elements, said cylindrical liquid container expanding and contracting only when the vibrational amplitude of the structure causes said structure to move a distance greater than the width of said gap.

* * * * *